United States Patent [19]
Chelak

[11] Patent Number: 5,139,151
[45] Date of Patent: Aug. 18, 1992

[54] METHOD OF FORMING FOAM CUSHIONS FOR PACKAGING PURPOSES AND CUSHIONS FORMED THEREBY

[75] Inventor: Yaroslaw S. Chelak, Mendham Township, Morris County, N.J.

[73] Assignee: Sealed Air Corporation, Saddle Brook, N.J.

[21] Appl. No.: 681,864

[22] Filed: Apr. 5, 1991

Related U.S. Application Data

[62] Division of Ser. No. 378,587, Jul. 11, 1989, Pat. No. 5,027,583.

[51] Int. Cl.$^5$ ............................................. B65D 81/04
[52] U.S. Cl. .................................. 206/523; 206/521; 383/120; 428/71
[58] Field of Search ............... 206/521, 523, 524, 594; 383/120, 902, 907; 428/68, 69, 71, 76, 34.3, 36.5

[56] References Cited

U.S. PATENT DOCUMENTS

| | | | |
|---|---|---|---|
| 3,006,257 | 10/1961 | Orsini | 383/120 |
| 3,027,065 | 3/1962 | Linquist | 383/120 |
| 3,190,442 | 6/1965 | Gauss . | |
| 3,222,843 | 12/1965 | Schneider . | |
| 3,234,705 | 2/1966 | Schwartz . | |
| 3,269,642 | 8/1966 | Cvacho | 383/120 |
| 3,412,521 | 11/1968 | Bauman | 206/523 |
| 3,485,347 | 12/1969 | McGill et al. . | |
| 3,508,374 | 4/1970 | Bertoglio | 383/904 |
| 3,659,775 | 5/1972 | Truman . | |
| 3,735,551 | 5/1973 | Pratt . | |
| 3,851,814 | 12/1974 | Stage . | |
| 4,077,186 | 3/1978 | Voegele . | |
| 4,174,598 | 11/1979 | Shepherd et al. . | |
| 4,318,506 | 3/1982 | Hirsch . | |
| 4,384,442 | 5/1983 | Pendleton . | |
| 4,620,633 | 11/1986 | Lookholder . | |
| 4,674,268 | 6/1987 | Gavronsky et al. . | |
| 4,693,056 | 9/1987 | Raszewski . | |
| 4,791,776 | 12/1988 | Jackman et al. . | |
| 4,800,708 | 1/1989 | Sperry . | |
| 4,854,109 | 8/1989 | Pinarer et al. . | |
| 4,944,529 | 7/1990 | Backhaus | 206/522 |

*Primary Examiner*—Jimmy G. Foster
*Attorney, Agent, or Firm*—Bell, Seltzer, Park & Gibson

[57] ABSTRACT

The invention is a method of forming large-volume foam cushions for packaging purposes wherein each cushion comprises a closed bag formed from respective first and second superposed sheets of plastic material and filled with foam. The method comprises folding at least one of the first and second sheets of plastic material along one side edge portion of the sheets inwardly to form a first longitudinally extending gusset therein; folding at least one of the first and second sheets of plastic material along the opposite side edge portion of the sheets inwardly to form a second longitudinally extending gusset therein; longitudinally sealing the outer side edges of the first and second sheets together to form a gusseted tube thereof; transversely sealing the first and second sheet together along a line generally perpendicular to the longitudinal side edge seals to thereby form a closed end of the gusseted tube; injecting a predetermined amount of a foamable composition into the closed end of the gusseted tube; and transversely sealing the gusseted tube along a line longitudinally spaced from the first transverse seal to thereby form a sealed bag containing the foamable composition, wherein as the foamable composition foams the gussets expand to produce a cushion of greater volume.

1 Claim, 3 Drawing Sheets

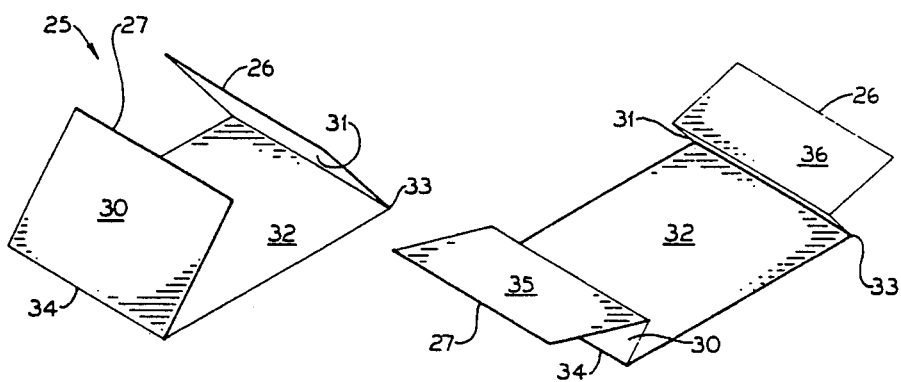
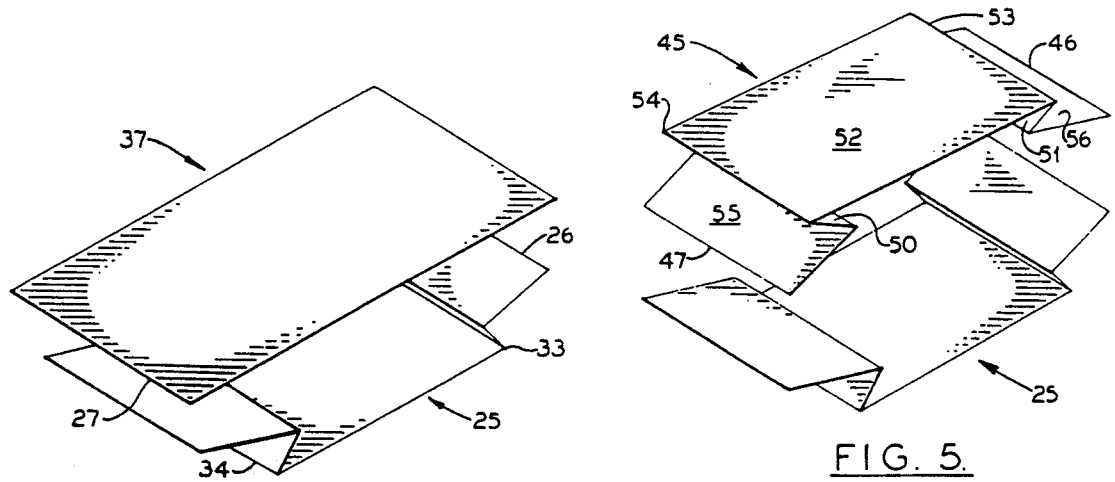
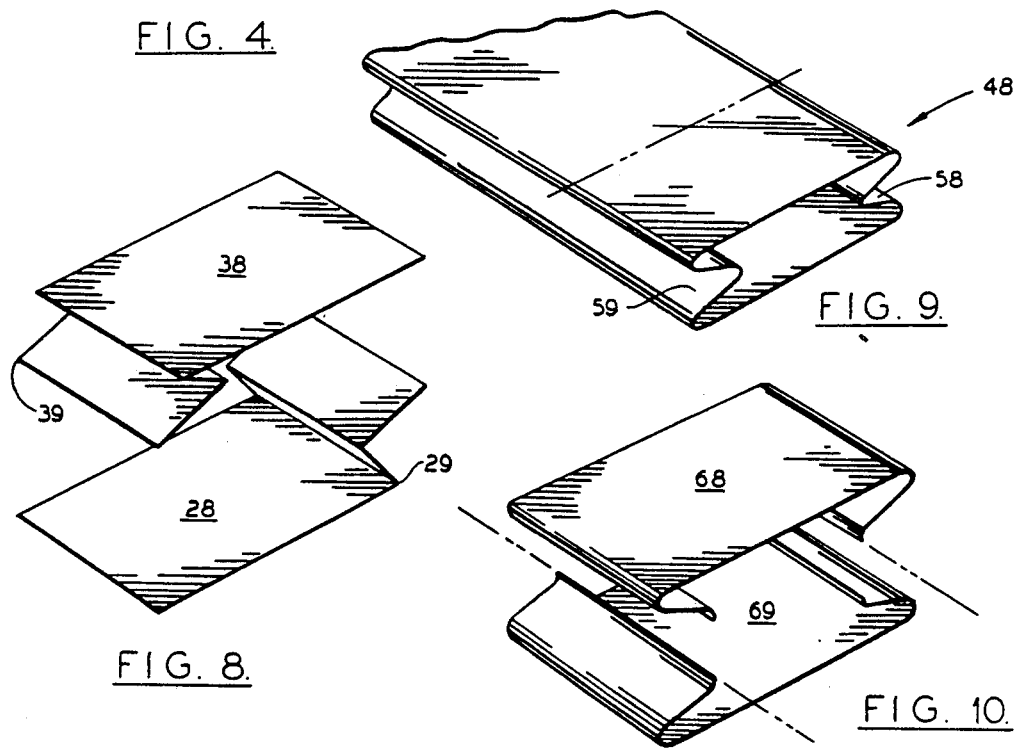

METHOD OF FORMING FOAM CUSHIONS FOR PACKAGING PURPOSES AND CUSHIONS FORMED THEREBY

This application is a divisional of application Ser. No. 07/378,587, filed Jul. 11, 1989, U.S. Pat. No. 5,027,583.

FIELD OF THE INVENTION

The present invention relates to the cushioning of articles in packages and in particular relates to a method of forming variable sized and shaped gusseted bags from plastic sheeting having variable widths and filling such bags with expandable foam to form packaging cushions of greater volume and to the cushion so formed. This application is related to U.S. Pat. No. 4,800,709 to Charles R. Sperry and to application Ser. No. 235,013 filed Aug. 22, 1988, now U.S. Pat. No. 4,854,109, on behalf of Talat Pinarer and German Gavronsky both of which are assigned to the assignee of the present invention and the contents of both of which are incorporated entirely herein by reference.

BACKGROUND OF THE INVENTION

Forming protective packaging for various articles of different sizes and shapes is a common problem in the packaging industry. Articles which are fragile in nature as well as those which are heavy tend to cause the most concern in packaging applications. In many circumstances, such articles are either desirably or necessarily packaged within generally square or rectangular packaging cartons for handling and shipment. Where the size and shape of the article to be packaged varies from such rectangular or square shaped containers, a typical solution is to include some sort of cushioning material to fill up the otherwise empty space created by the difference in shape and size of the article and that of the container.

Prior packaging methods which exist include the use of loose, friable material, sheets of cushioning material, and foam-in-place packing. Several patent references disclose foam packaging methods. U.S. Pat. No. 3,222,843 to Schneider discloses a gusseted bag filled with an expandable cushioning material. U.S. Pat. No. 3,190,442 to Gauss discloses the placement of a cushioning device in the storage container as well as an expandable material and a chemical formula for foam. U.S. Pat. No. 3,485,347 to McGill et al. discloses foam cushioning packages formed by adding a foamable material through flexible tubing folded to fit in the shipment container. While these patents provide several alternatives in size or shape of bags used for package cushioning, disadvantages remain in all three. In particular, no method for automatically concurrently forming and filling the bags is provided. Also, none of these patents address the issue of manufacturing the same style of bag in various shapes and sizes.

U.S. Pat. No. 3,851,814 to Stage discusses a method of forming a gusseted plastic bag from two webs of material in a face-to-face configuration. Stage, however, provides for the formation of bags for somewhat sophisticated applications (i.e. sanitary packing of medical devices) from two webs of different material. Nevertheless, certain disadvantages remain. In particular, Stage discloses no method for filling bags with foam, or any other material during formation of the bag.

U.S. Pat. No. 4,318,506 to Hirsch and U.S. Pat. No. 3,659,775 to Truman, both disclose gusseted bags. Hirsch provides a contaminant free bag formed by converging two webs potentially having different widths. Disadvantages remain, however, in that Hirsch does not provide a means for concurrently forming and filling the bag. Also, in the event expandable foam material were inserted into the bag, resulting expansion would likely cause the adhesive top seal of the bag to break loose resulting in spillage of the expandable foam material once the packaging cushion is in place. Although Truman does disclose a gusseted bag, the disclosed technique is disadvantageous in that it uses a single web rather than two converging face-to-face webs to form the bag, thus resulting in a need for specialized machinery.

A greatly improved approach to the manufacture of foam-in-place packing is disclosed in the above-referenced U.S. Pat. No. 4,800,709 and pending application Ser. No. 235,013. Both of these disclose an apparatus and method for forming foam cushions for packaging purposes whereby the foam cushions are formed by converging two sheets of plastic-like material in a face-to-face configuration and heat sealing the edges of the respective face-to-face sheets together to form a bag in which a foamable composition is enclosed.

One or more of the resulting bags may be placed in a box along with an article to be shipped. Shortly after the box is sealed shut, the foamable composition expands encircling the article to form an instant custom package. As further discussed in these disclosures, the method produces a cushion that has a ventilation opening in at least one side edge. The opening allows gases generated by the foamable composition to exit the bag so that the resulting cushion is almost entirely filled with foam rather than foam and air. The apparatus and method permit continuous manufacture of foamable cushioning packages and have greatly facilitated the automatic formation of custom packages while preventing spillage of the foam cushioning material onto articles as they are being packed.

One area for improvement in the method, however, is that packing cartons for shipping articles tend to vary widely in size and shape depending upon the size and shape of the articles to be shipped. As a result, various size foam-in-place packing are advantageous, desireable or necessary. Typically, however, the equipment described in the referenced patent and pending application is obtained and used in one particular size. The apparatus does permit the length of the cushions to be varied during continuous production, but changing the width of material used requires either an adjustment or a different size apparatus. Therefore when packages of relatively large variance in size are required, wider cushions must be manufactured by a different sized machine.

OBJECT OF THE PRESENT INVENTION

It is accordingly an object of the present invention to provide a method for concurrently forming and filling variable shaped and sized cushioning packages, particularly cushions of larger volume in a continuous manner of the described type, and from a single standardized machine while avoiding the above noted disadvantages of the prior methods and products.

The present invention varies the size of the bag, including its width, without adjusting the machine. Therefore, the present invention can be practiced on the same apparatus disclosed in U.S. Pat. No. 4,800,709 or in pending application Ser. No. 235,013.

SUMMARY OF THE INVENTION

The invention includes a method of forming large-volume foam cushions for packaging purposes from first and second elongate sheets of plastic material, with each sheet defining opposite longitudinal side edge portions, and wherein each cushion comprises a closed bag formed from respective first and second superposed sheets of plastic material and filled with foam. The method comprises folding at least one of the first and second sheets of plastic material along one side edge portion of the sheets inwardly to form a first longitudinally extending gusset therein; folding at least one of the first and second sheets of plastic material along the opposite side edge portion of the sheets inwardly to form a second longitudinally extending gusset therein; longitudinally sealing the outer side edges of the first and second sheets together to form a gusseted tube thereof with the first and second gussets positioned along opposite sides of the tube; transversely sealing the first and second sheet together along a line generally perpendicular to the longitudinal side edge seals to thereby form a closed end of the gusseted tube; injecting a predetermined amount of a foamable composition into the closed end of the gusseted tube; and transversely sealing the gusseted tube along a line longitudinally spaced from the first transverse seal to thereby form a sealed bag containing the foamable composition, wherein as the foamable composition foams the gussets expand to produce a cushion of greater volume. The invention further includes the cushions formed by the abovedescribed method.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DESCRIPTION OF THE DRAWINGS

FIGS. 2 and 3 are perspective views of the manner in which a plastic sheet is folded according to the present invention;

FIG. 4 is a perspective view of a second sheet being brought into face-to-face relationship with a folded sheet;

FIGS. 5 and 8 are two perspective views of two folded sheets being brought into face-to-face relationship with one another;

FIG. 9 is a perspective view of tucking the sides of a tube to form longitudinal gussets; and FIG. 10 is a perspective view of slitting longitudinal gussets to form two sheets.

DETAILED DESCRIPTION OF THE PREFERRED EMBODIMENT

Figure 1:
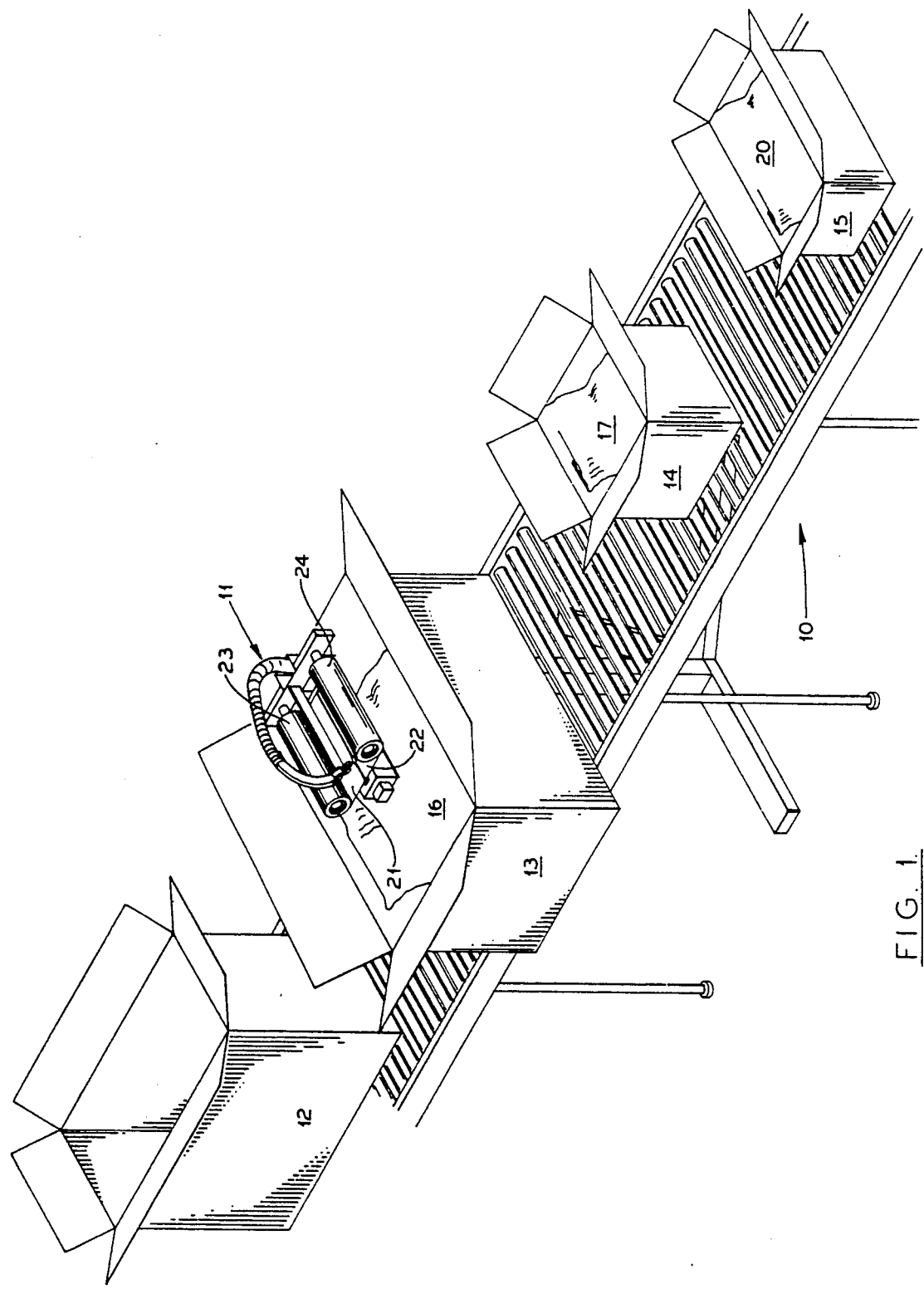
FIG. 1 is an environmental view of a packaging line of the type for which the present invention is particularly well adapted.

The method of forming large volume foam cushions for packaging purposes wherein each cushion comprises a closed plastic bag filed with foam according to the present invention will now be described in detail. FIG. 1 illustrates a typical packaging installation including a conveyor broadly designated at 10; a device for producing foam cushions such as disclosed in U.S. Pat. No. 4,800,709 and pending application Ser. No. 07/235,013 and broadly designated at 11; a series of variably sized containers 12, 13, 14, and 15 respectively; and foam packaging cushions 16, 17 and 20, deposited into three of the containers.

As illustrated in FIG. 1, because Containers come in a number of different sizes, convenience would dictate that foam cushions likewise be available in a number of different sizes. A device such as the packaging apparatus 11, however, most conveniently uses only a few, sometimes only one, sizes of plastic material resulting in bags at a certain width. As described previously, however, the length of such bags can be variably controlled by the device 11, but their width cannot, and is basically limited to the width of the two webs or sheets of plastic 21 and 22 which are fed from their respective supply rolls 23 and 24 as will be described later herein.

In order to form such larger volume foam cushions for packaging purposes, the method of the present invention is illustrated in the sequence of FIGS. 2, 3 and 4. In this sequence, a first sheet of plastic material is broadly designated at 25. It will be understood that although FIGS. 2 through 6 show the plastic sheet material as an individual separate piece, this is for purposes of explanation and clarity and not limitation. In actual practice, the method of the invention can be practiced with any length of plastic sheet material, including continuous lengths, and is not limited to individual pieces as illustrated.

As FIG. 2 illustrates, the opposite side edges 26 and 27 are first folded inwardly to form corresponding folded side portions 30 and 31 of the sheet 25 which overly the remaining unfolded portion 32 of the sheet and thereby defining corresponding outer folded edges 33 and 34 of the first sheet 25. In the illustrations of FIGS. 2, 3 and 4, the sheet is not shown as being completely folded over, but this is for purposes of clarity of illustration and it will be understood that in the invention the sheet 25 is completely folded and does not remain in the particular orientation shown in FIG. 2.

FIG. 3 shows that the next step is the step of subsequently folding the opposite side edges 26 and 27 outwardly beyond the outer folded edges 33 and 34 to form second corresponding folded side portions 35 and 36 respectively which overly both the first folded side portions 30 and 31 and the unfolded portion 32 of the first sheet 25, and so that the opposite side edges 26 and 27 of the first sheet 25 are positioned outwardly from the respective outer folded edges 33 and 34.

The result of the folding process is a longitudinally extending gusset in each side edge portion of the sheet. As used herein, the term "gusset" refers to the folded-in-and-out portions just described which form an expandable insert in the bag that results.

FIG. 4 illustrates the next step, that of bringing a second sheet of plastic material, broadly designated at 37, which has a dimensional width at least as great as the width defined by the opposite edges 26 and 27 of the first folded sheet 25, into face-to-face relationship with the folded first sheet 25. The sheets 25 and 37 are then longitudinally sealed to one another adjacent the opposite sides edges 26 and 27 of the first sheet along those respective parts of the second folded portions 35 and 36 which are outward of the outer folded edges 33 and 34 and inward of the opposite side edges 26 and 27. In other words, the sheets are sealed to each another in a manner which avoids interfering with the folds so that the folds are free to unfold as desired as the plastic bag fills with foam to form a large volume cushion.

Figure 6:
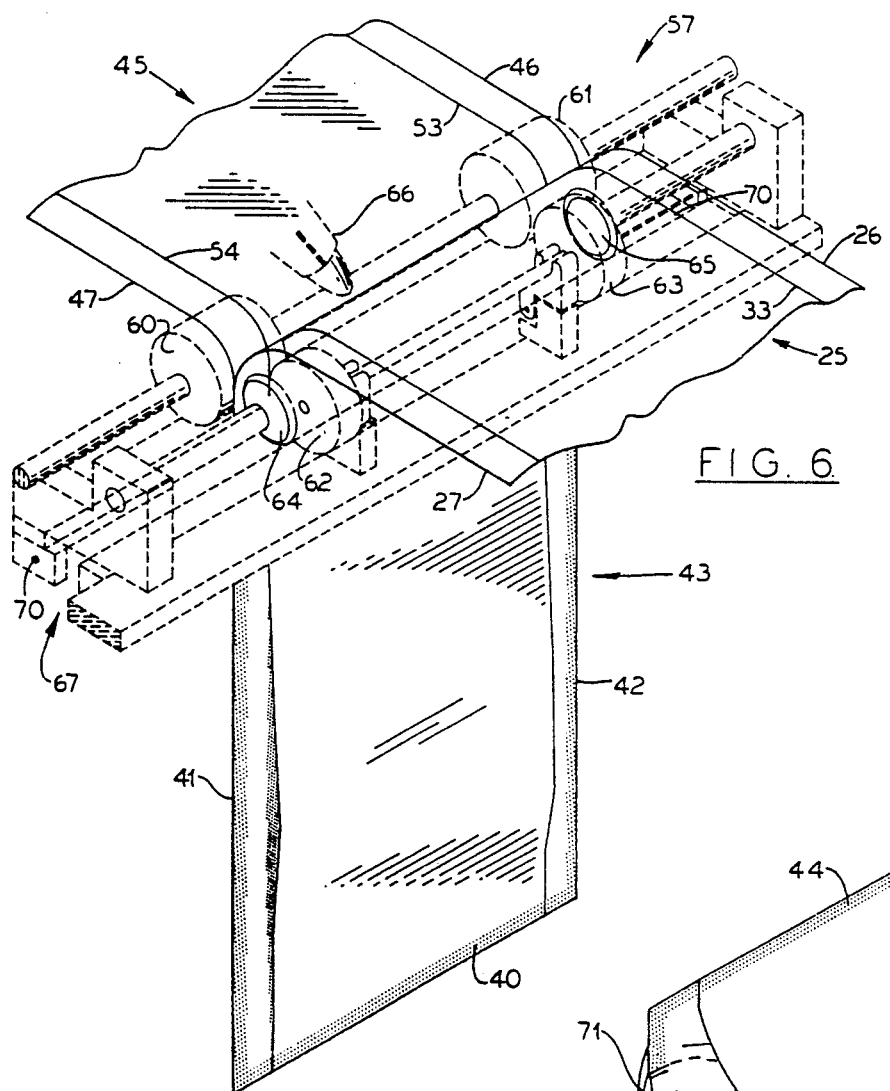
FIG. 6 is a perspective view of a portion of the machinery used to automatically produce the cushions of the present invention.

In the next step, one edge of the first and second sheets are sealed to each other along a line generally perpendicular to the longitudinal seals to form a first transverse seal 40 which is best illustrated in FIG. 6, and other details of which will be described later herein. FIG. 6 also shows the longitudinal seals 41 and 42 which together with the transverse seal 40 form an opened bag defined by the seals 40, 41, and 42. The bag defined by the seals is broadly designated at 43, and can also be described as a gusseted tube with one end sealed.

In the next step, the opened bag 43 is injected with a predetermined amount of a foamable composition after which the bag is transversely sealed at a position longitudinally spaced from the first seal 40 to form a second transverse seal 44 and to in turn form a sealed bag filled with the foamable composition for which the folded portions may expand as the foamable composition foams to produce a cushion of greater volume than one formed from unfolded sheets.

FIG. 5 shows a second embodiment of the method in which a second sheet broadly designated at 45 is folded in a manner identical to the manner in which the first sheet 25 is folded as described previously. As a result, the second sheet 45 also includes corresponding opposite side edges 46 and 47, first folded side portions 50 and 51, an unfolded portion 52, outer folded edges 53 and 54 and second side portions 55 and 56.

In this embodiment, the sheets 25 and 45 are guided into face-to-face contact with one another to longitudinally seal the sheets to one another adjacent the opposite side edges of each sheet along that part of the second folded portion of each sheet which is outward of the outer folded edges and inward of the opposite side edges of each sheet.

In the embodiment shown in FIG. 8 the method can comprise folding a first sheet 28 along one side edge portion to form the first gusset 29 and folding a second sheet along its respective opposite side edge portion to form the other gusset 29 and then sealing the sheets in the manners just described. Similarly, there is no reason that the sheets must be sealed together along the particular portion just described. Where appropriate anvils or the like are provided, the sheets could be sealed inwardly along the gusseted portions, provided that the gusseted portions remained unsealed to the extent desired or necessary to accomplish the objects of the invention; i.e. there would be no advantage to totally sealing the gussets as the result would be the same as if no gussets were provided. There may arise occasions, however, where partially sealing the gussets, or sealing the bag within the gusseted areas is desireable or necessary and the invention covers these situations as well.

In yet another embodiment, and as illustrated in FIGS. 9 and 10, it has been found, convenient under certain circumstances to use a tube 48 of plastic film as the starting material. In this embodiment, the opposite sides of the tube are tucked inwardly to form longitudinally extending gussets 58 and 59 therein. The tube is then slit adjacent the longitudinally extending gussets to form the respective first and second sheets 68 and 69 of superposed plastic film material with the respective longitudinally extending gussets along the side edges of the superposed sheets. This embodiment offers the advantage of tucking the tube to form the gussets as opposed to folding one or more separate sheets to form the gussets.

FIG. 6 is a partial view of a large volume foam cushion for packaging purposes being formed on an apparatus which can successfully form such cushions. As set forth earlier, the detailed structure and operation of such an apparatus are clearly set forth in U.S. Pat. No. 4,800,709 and pending application Ser. No. 07/235,013, U.S. Pat. No. 4,854,109. For purposes of clarity, the description and operation of the apparatus will not be entirely redescribed in detail herein, but will be limited to those elements which are helpful in understanding the present invention.

A pair of sheets of plastic material 25 and 45 are advanced along a predetermined path of travel from respective supply sources which are shown in FIG. 1 as the supply rolls 23 and 24. As just described herein, the opposite side edges of each sheet have been folded inwardly to form first corresponding side portions of each sheet which overly the remaining unfolded of the sheet and to define corresponding outer folded edges of the sheet and wherein the opposite side edges of each sheet have subsequently been folded outwardly beyond the outer folded edges to form second corresponding folded side portions overlying both the first folded side portion and the unfolded portion of the sheet. In this orientation, the opposite side edges of each sheet are positioned outwardly from the respective outer folded edges. FIG. 6 illustrates such folded sheets in a flattened orientation and in particular illustrates side edges 46 and 47 of sheet 45 as well as the outer folded edges 53 and 54. Similarly, the side edges 26 and 27 of sheet 25 are illustrated along with the outer folded edges 33 and 34.

The sheets 25 and 45 are guided into face-to-face contact with one another at a heat-sealing station broadly designated at 57 to longitudinally seal the sheets to one another in the manner described earlier. A gusseted tube is thusly formed.

The step of advancing the sheets includes passing the sheets between drive roll means illustrated as the driving rollers 60, 61, 62, and 63 which together define a nip. The first heat-sealing station also comprises a pair of heated rolls 64 and 65 positioned adjacent the nip and contact with the advancing sheets 25 and 45. The sheets 25 and 45 are advanced in a generally downward direction in an opposing and converging relationship. Periodically, a predetermined amount of foamable compositions is introduced between the sheets from a discharge location between the converging sheets and in close proximity to the point at which the sheets initially contact each other. In FIG. 6, this is illustrated as the foam injection nozzle 66 that deposits foamable composition in each bag being formed.

While the foam is periodically being introduced, the sheets are also being advanced to and through a second heat-sealing station broadly designated at 67 which transversely heat seals the webs together to form a sealed top edge for each successive bag of foamable composition and also severs each bag from the next succeeding bag while forming a sealed bottom for the next succeeding bag. In this manner, the apparatus forms separate and individual bags for which the folded portion may expand as the foamable composition foams to produce a cushion of greater volume than one formed from unfolded sheets. In FIG. 6, the second heat sealing station is illustrated as heated wire 70.

Figure 7:
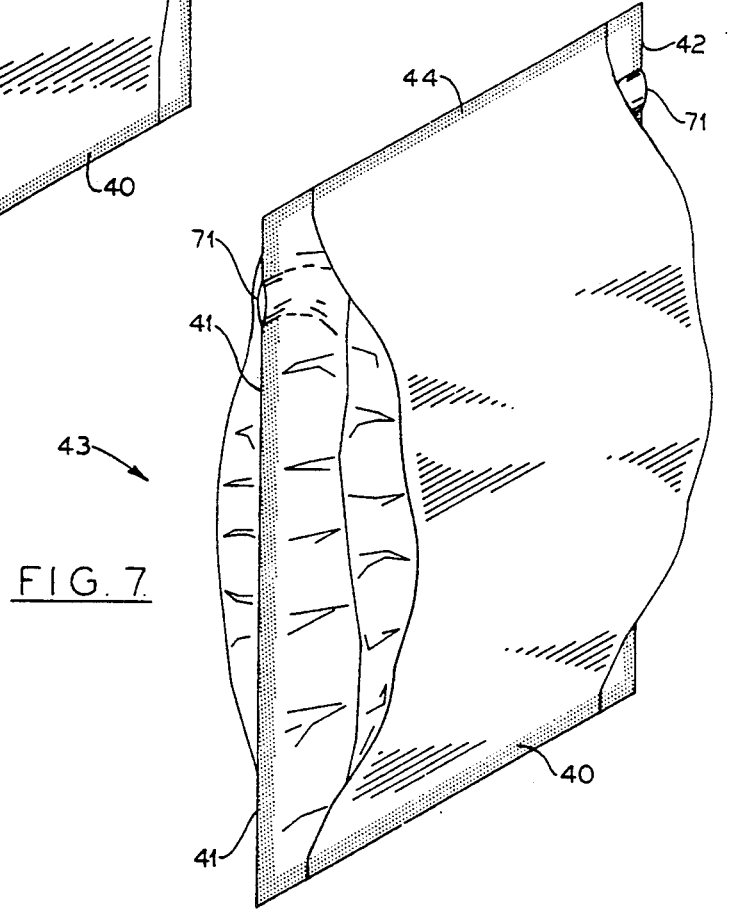
FIG. 7 is a perspective view of an expanded bag formed according to the present invention.

In a further embodiment of the invention, and as described in the aforementioned patent and patent application, the step of longitudinally sealing the sheets to one another can comprise providing a small vent opening in the bag so that gases generated by the foamable composition may be ventilated from the sealed bag. Such a ventilation opening is illustrated in FIG. 7 as the small non-sealed portion 71 which interrupts the seal 41 of bag 43. As is known to those familiar with typical foamable compositions, they are often formed from two components which when brought together generate a polymeric material and a gas. As the gas exits the polymeric material, it tends to form bubbles which foam the polymeric material. With the ventilation opening 71 so provided, these generated gases can escape from the bag so that the bag will be filled with foam, rather than foam and gases. When a bag is placed into a container, this allows the bag to cushion the item in the container substantially entirely with foam, rather than with foam and gas.

When a cushion such as bag 43 is produced in the apparatus 11, the opening 71 is produced by periodically and momentarily interrupting the heat-sealing of the sheets to each other along at least one of the side edges during the advancement of the sheets through the first heat sealing station 57. In this manner, at least one unsealed longitudinal side edge portion is formed and defines the side edge opening 71 for the bag. In the apparatus shown in FIG. 6, the step of periodically and momentarily interrupting the heat sealing of the sheets includes effecting lateral displacement of the pair of heated rolls 64 and 65 so that they are removed from contact with the advancing sheets. As a further portion of the method of using the apparatus 11, the method further comprises momentarily terminating the advance of the two sheets and laterally displacing the pair of heated rolls 64 and 65 from contact with the sheets during the step of contacting the sheets with the heated wire 70. This of course prevents the heated rolls, which are designed to seal the plastic material while it is moving, from damaging the material while it is stationary.

The invention therefore results in a method of producing foam cushions for packaging purposes, particularly cushions of larger volume that can be produced on apparatus originally intended to form cushions of more limited size.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A large volume packaging cushion for custom packaging applications of the type in which a bag containing a foamable composition is added to a container holding an item to be cushioned, said cushion comprising:

first and second superimposed sheets of heat sealable thermoplastic material wherein at least one of said first and second sheets of plastic material has an inwardly extending fold along one side edge portion that forms a first longitudinally extending gusset therein and wherein at least one of said first and second sheets of plastic material has an inwardly extending fold along the opposite side edge portion that forms a second longitudinally extending gusset therein;

a pair of longitudinal seals in said first and second sheets and positioned along the respective outer side edges of said first and second sheets so that said longitudinal seals define a gusseted tube formed from said sealed sheets;

at least one longitudinal side edge portion that defines at least one side edge opening for said bag;

a pair of transverse seals along lines generally perpendicular to said longitudinal seals and wherein each transverse seal intersects each longitudinal seal so that said longitudinal seals and said transverse seals define a gusseted bag with said sealed outer edges for providing a bag with an increased potential filled volume as compared to a bag having similar size unfolded sheets; and a predetermined amount of foamable composition inside said sealed gusseted bag.

* * * * *

UNITED STATES PATENT AND TRADEMARK OFFICE
CERTIFICATE OF CORRECTION

PATENT NO. : 5,139,151

DATED : August 18, 1992

INVENTOR(S) : Yaroslaw S. Chelak

It is certified that error appears in the above-identified patent and that said Letters Patent is hereby corrected as shown below:

On the title page:
UNDER "REFERENCES CITED":

Under reference no. 3,027,065, "Linquist" should be --Linquist et al.--.

At column 1, line 16; column 2, lines 16 and 67; column 4, line 5; column 6, line 9, "4,800,709" should be --4,800,708--.

At column 2, line 44 and column 5, line 56, "desireable" should be --desirable--.

At column 3, line 31, "abovedescribed" should be --above-described--.

At column 3, last line, "filed" should be --filled--.

At column 4, line 10, "Containers" should be --containers--.

At column 4, lines 37 and 49; and column 6, line 21, "overly" should be --overlie--.

At column 5, line 43, after "sheet" insert --38--.

At column 5, line 44, "29" should be --39-.

At column 6, line 21, after "unfolded" insert --portion--.

UNITED STATES PATENT AND TRADEMARK OFFICE
CERTIFICATE OF CORRECTION

PATENT NO. : 5,139,151
DATED : August 18, 1992
INVENTOR(S) : Yaroslaw S. Chelak

It is certified that error appears in the above-indentified patent and that said Letters Patent is hereby corrected as shown below:

Column 8, line 37, after "outer" insert --side--.

Signed and Sealed this

Second Day of November, 1993

Attest:

BRUCE LEHMAN

Attesting Officer     Commissioner of Patents and Trademarks